United States Patent
Yoo et al.

(10) Patent No.: US 12,132,222 B2
(45) Date of Patent: Oct. 29, 2024

(54) BATTERY PACK AND DEVICE INCLUDING THE SAME

(71) Applicant: LG ENERGY SOLUTION, LTD., Seoul (KR)

(72) Inventors: Hyongseok Yoo, Daejeon (KR); Soon Chang Hong, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 78 days.

(21) Appl. No.: 17/608,556

(22) PCT Filed: Nov. 2, 2020

(86) PCT No.: PCT/KR2020/015106
§ 371 (c)(1),
(2) Date: Nov. 3, 2021

(87) PCT Pub. No.: WO2021/112412
PCT Pub. Date: Jun. 10, 2021

(65) Prior Publication Data
US 2022/0231376 A1    Jul. 21, 2022

(30) Foreign Application Priority Data
Dec. 2, 2019 (KR) .......................... 10-2019-0158412

(51) Int. Cl.
*H01M 50/342* (2021.01)
*H01M 50/262* (2021.01)
*H01M 50/375* (2021.01)

(52) U.S. Cl.
CPC ....... *H01M 50/342* (2021.01); *H01M 50/262* (2021.01); *H01M 50/375* (2021.01); *H01M 2220/20* (2013.01)

(58) Field of Classification Search
CPC ............. H01M 50/342; H01M 50/262; H01M 50/375; H01M 2220/20; H01M 50/394; H01M 50/204; H01M 2200/10
See application file for complete search history.

(56) References Cited

U.S. PATENT DOCUMENTS 5,121,932 A    6/1992 Goldman et al.
5,536,023 A    7/1996 Surbrook et al.
(Continued)

FOREIGN PATENT DOCUMENTS

CN    203954502 U    11/2014
JP    5-172262 A    7/1993
(Continued)

OTHER PUBLICATIONS

Table 1. Material Comparison Chart. Retrieved from https://app.knovel.com/hotlink/itble/rcid:kpSAMPESC1/id:kt01212EB2/sampe-seattle-2017-conference/table-1-material-comparison (Year: 2017).*
(Continued)

*Primary Examiner* — Matthew T Martin
*Assistant Examiner* — Grace Ann Kenlaw
(74) *Attorney, Agent, or Firm* — Birch, Stewart, Kolasch & Birch, LLP (57) ABSTRACT

A battery pack includes: a lower case and an upper case; and an annular gasket formed between the lower case and the upper case to seal between the cases, wherein the gasket includes first and second sealing parts connected to each other, and wherein a melting point of the second sealing part is lower than the melting point of the first sealing part.

10 Claims, 8 Drawing Sheets

(56) References Cited

U.S. PATENT DOCUMENTS

| | | |
|---|---|---|
| 7,125,627 B2 | 10/2006 | Gu |
| 2004/0038126 A1 | 2/2004 | Gu |
| 2004/0265683 A1 | 12/2004 | Merrill et al. |
| 2011/0135975 A1 | 6/2011 | Fuhr et al. |
| 2012/0086176 A1 | 4/2012 | Kondou et al. |
| 2012/0308858 A1 | 12/2012 | Hermann et al. |
| 2013/0249173 A1 | 9/2013 | Yamamoto |
| 2014/0106196 A1* | 4/2014 | Ahn .................. H01M 50/271 429/100 |
| 2016/0091093 A1 | 3/2016 | Lee et al. |
| 2017/0250382 A1 | 8/2017 | Chemg et al. |

FOREIGN PATENT DOCUMENTS

| | | |
|---|---|---|
| JP | 9-32824 A | 2/1997 |
| JP | 2005-116474 A | 4/2005 |
| JP | 2008-502120 A | 1/2008 |
| JP | 2012-97896 A | 5/2012 |
| JP | 2015-108407 A | 6/2015 |
| JP | 2017-220344 A | 12/2017 |
| JP | 2016-96080 A | 5/2018 |
| KR | 10-1078855 B1 | 11/2011 |
| KR | 1078855 B1 * | 11/2011 |
| KR | 10-2013-0095302 A | 8/2013 |
| KR | 10-2018-0051120 A | 5/2018 |

OTHER PUBLICATIONS

Boomadmin. (Jan. 25, 2020). Rubber Temperature Range—Stockwell Elastomerics. Stockwell Elastomerics. https://www.stockwell.com/blog/rubber-temperature-range/#:~:text=Natural%20Rubber%3A%20less%20than%20250%C2%B0F%20%28121%C2%B0C%29%20Chloroprene%20%28Neoprene%29%3A,than%20300%C2%B0F%20%28149%C2%B0C%29%20EPDM%3A%20less%20than%20400%C2%B0F%20%28204%C2%B0C%29 (Year: 2020).*

International Search Report (PCT/ISA/210) issued in PCT/KR2020/015106, dated Feb. 15, 2021.

"Rubber Temperature Range", Stockwell Elastomerics, Technical Resources, Elastomerics Blog, dated Sep. 22, 2009, https://www.stockwell.com/blog/rubber-temperature-range/, 1 page total.

Extended European Search Report for European Application No. 20897263.8, dated May 15, 2024.

* cited by examiner

【FIG. 1】

Prior Art

【FIG. 2】

Prior Art

[FIG. 3]

Prior Art

BATTERY PACK AND DEVICE INCLUDING THE SAME

CROSS CITATION WITH RELATED APPLICATION(S)

This application claims the benefit of Korean Patent Application No. 10-2019-0158412 filed on Dec. 2, 2019 with the Korean Intellectual Property Office, the disclosure of which is incorporated herein by reference in its entirety.

TECHNICAL FIELD

The present disclosure relates to a battery pack and a device including the same, and more particularly, to a battery pack containing a gasket and a device including the same.

BACKGROUND ART

Recently, along with the increase of the technological development and demand for a mobile device, demand for a secondary battery capable of charging and discharging as an energy source rapidly increases, and accordingly, many researches of the battery capable of meeting a variety of needs are performed.

Further, the secondary battery has attracted considerable attention as a power source for electric vehicles (EV), hybrid electric vehicles (HEV), and plug-in hybrid electric vehicles (Plug-in HEV), which have been developed to solve problems, such as air pollution, caused by existing gasoline and diesel vehicles using fossil fuels.

Therefore, an electric vehicle (EV), which can be driven only by a secondary battery, and a hybrid electric vehicle (HEV), which combines a conventional engine with a secondary battery, have been developed and some thereof have been commercialized. A nickel-metal hydride (Ni-MH) secondary battery has been mainly used as the power source of EV, HEV and the like. Recently, however, studies using lithium secondary batteries having high energy density, high discharge voltage and output stability have been actively conducted.

When such a secondary battery is used as an automobile power source, the secondary battery is used in the form of a battery pack containing a plurality of battery modules or a battery module assembly. Vehicle battery packs are configured such that rubber gaskets are located in upper and lower cases in order to seal the battery pack.

Figure 1:
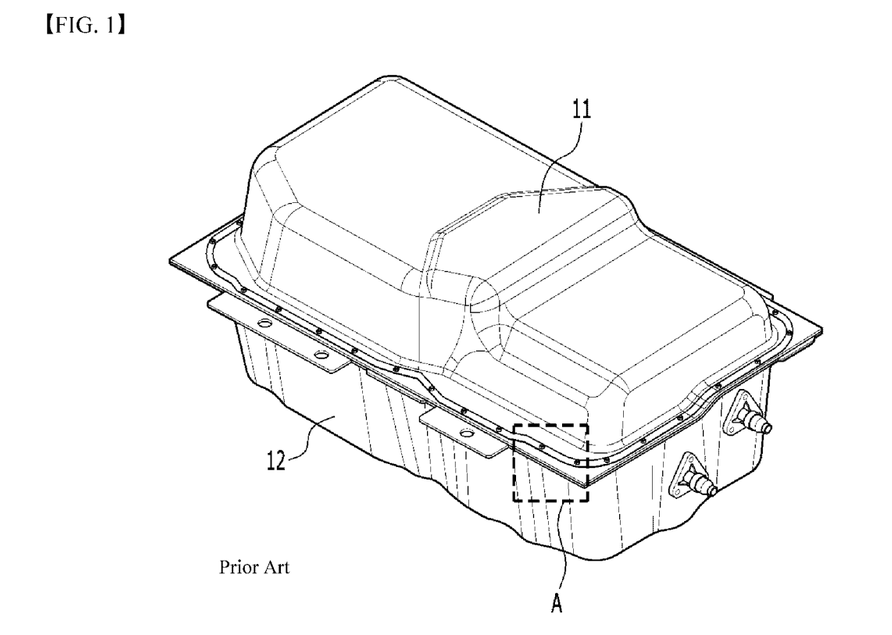
FIG. 1 is a diagram showing the appearance of a conventional battery pack.
Figure 2:
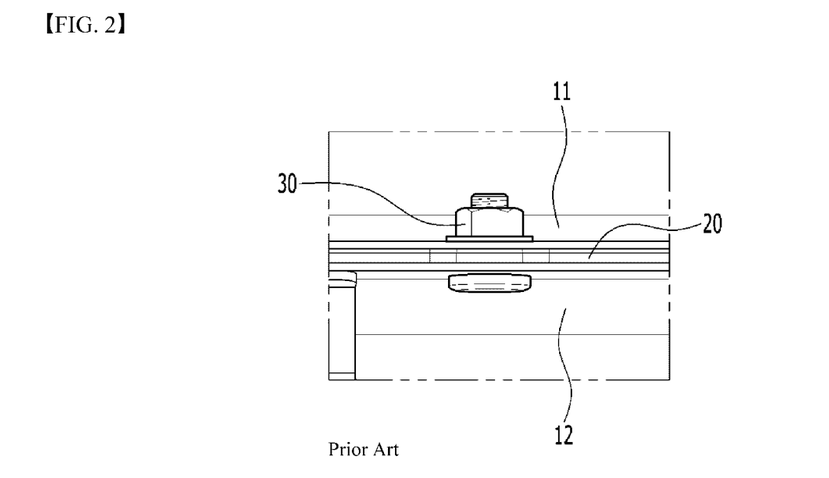
FIG. 2 is an enlarged view of part A in FIG. 1.
Figure 3:
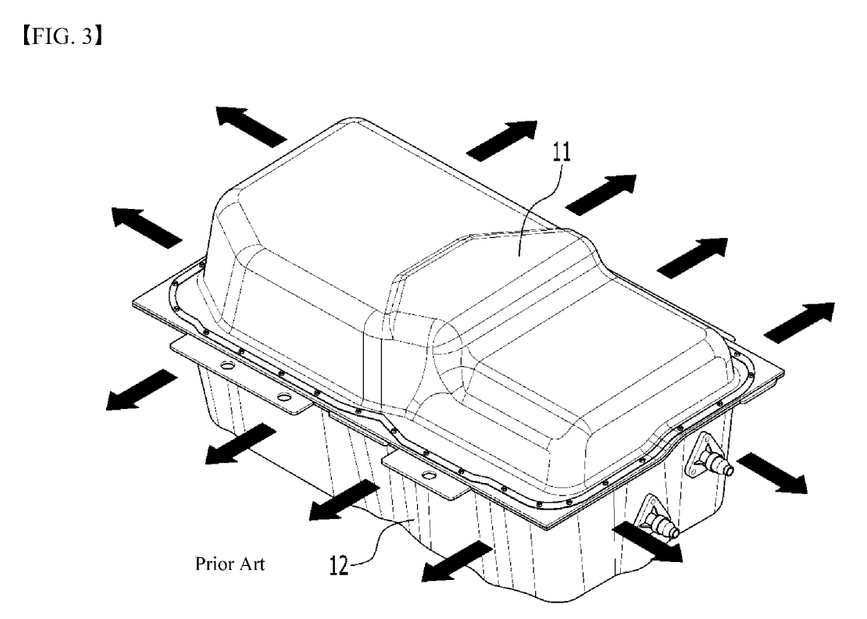
FIG. 3 is a diagram showing the gas discharge direction of the conventional battery pack.

FIG. 1 is a view showing the appearance of a conventional battery pack. FIG. 2 is an enlarged view of part A of FIG. 1. FIG. 3 is a view showing a gas discharge direction of a conventional battery pack.

Referring to FIGS. 1 to 3, the conventional battery pack is formed of an upper case 11 and a lower case 12, a rubber gasket 20 fixed via a fastening portion 30 is formed between the upper case 11 and the lower case 12, and the inside of the battery pack was sealed via the gasket 20. The gasket 20 is uniformly formed of a rubber material along the circumference between the cases, but when the gasket of the same material is uniformly formed around the case in this way, the gas through ignition may be discharged from all the gasket circumferential directions during the occurrence of an ignition phenomenon inside the battery pack as shown in FIG. 3.

This is because, when a pressure exceeding the sealing force is applied to the gasket 20, discharge can occur in all circumferential directions through the gasket 20 surface uniformly formed in the circumferential direction. However, since the vehicle battery pack is installed inside the vehicle, there is a problem that the vehicle and passengers may be in danger if the hot gas is discharged in the direction of the vehicle parts including the fuel tank.

DETAILED DESCRIPTION OF THE INVENTION

Technical Problem

It is an object of the present disclosure to provide a battery pack that can set the direction of gas discharge at the time of ignition, and a device including the same.

However, the problem to be solved by embodiments of the present disclosure is not limited to the above-described problems, and can be variously expanded within the scope of the technical idea included in the present disclosure.

Technical Solution

A battery pack according to one embodiment of the present disclosure includes: a lower case and an upper case; and an annular gasket formed between the lower case and the upper case to seal between the cases, wherein the gasket includes a first sealing part and a second sealing part connected to each other, and wherein a melting point of the second sealing part is lower than the melting point of the first sealing part.

Projection parts may be formed at opposite ends of the second sealing part, and groove parts may be formed at both ends of the first sealing part, and the projection parts are fitted into the groove parts.

The width of each projection part of the second sealing part may be wider than a width of each groove part of the first sealing part.

A bush may be formed in the center of the second sealing part, and a fastening member may be inserted into the bush to fix a position of the second sealing part.

Gas discharge channels may be formed on opposite sides of the bush through the melting of the second sealing part, and gas inside the cases may be discharged to the outside through the gas discharge channels.

The fastening member may be a bolt and a nut.

A fastening part may be formed in each of the upper case and the lower case, and the fastening member may connect the bush and the fastening parts.

The first sealing part may be formed of EPDM-based rubber, and the second sealing part may be formed of NR-based rubber.

The second sealing part may be a plurality of second sealing parts

The gasket may be formed in a square shape, and the plurality of second sealing parts may be arranged at one side of the gasket.

The gasket may be formed in a square shape, and the plurality of the second sealing parts may be arranged at a first side of the gasket and a second side connected to the first side.

A device including the battery pack is provided, wherein the second sealing part may be formed in a portion facing the outside among the gasket parts.

Advantageous Effects

According to the embodiments of the present disclosure, it is possible to discharge the gas inside the battery pack through the gas discharge channel formed by melting the second sealing part formed in the direction in which vehicle parts are not installed, thereby improving the stability of the battery pack installed in the device.

DETAILED DESCRIPTION OF THE EMBODIMENTS

Hereinafter, various embodiments of the present disclosure will be described in detail with reference to the accompanying drawings so that those skilled in the art can easily implement them. The present disclosure may be modified in various different ways, and is not limited to the embodiments set forth herein.

Portions that are irrelevant to the description will be omitted to clearly describe the present disclosure, and like reference numerals designate like elements throughout the specification.

Further, in the figures, the size and thickness of each element are arbitrarily illustrated for convenience of description, and the present disclosure is not necessarily limited to those illustrated in the figures. In the figures, the thickness of layers, regions, etc. are exaggerated for clarity. In the figures, for convenience of description, the thicknesses of some layers and regions are shown to be exaggerated.

Further, throughout the specification, when a portion is referred to as "including" a certain component, it means that it can further include other components, without excluding the other components, unless otherwise stated.

Hereinafter, a battery pack according to one embodiment of the present disclosure will be described.

Figure 4:
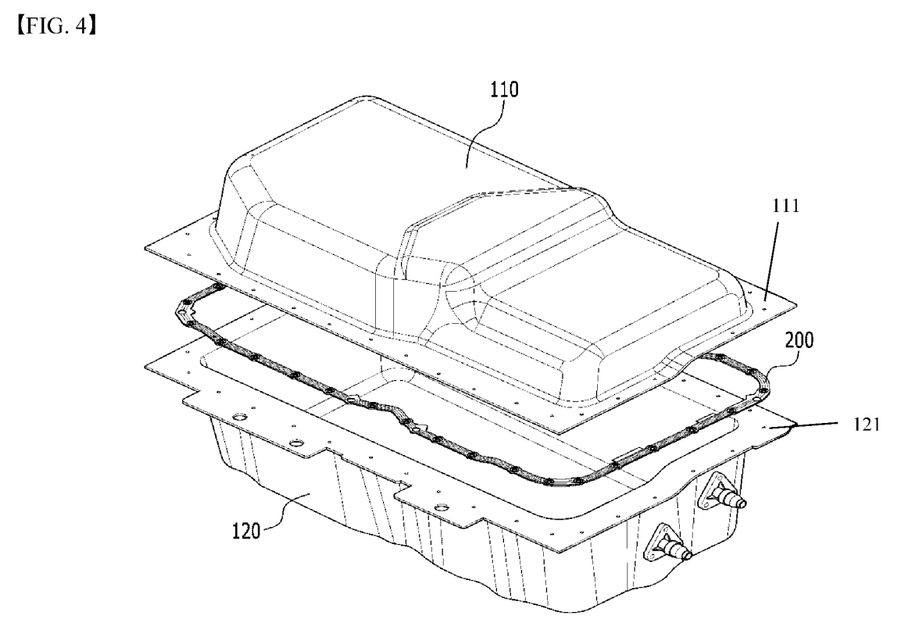
FIG. 4 is an exploded perspective view showing a battery pack according to one embodiment of the present disclosure.
Figure 5:
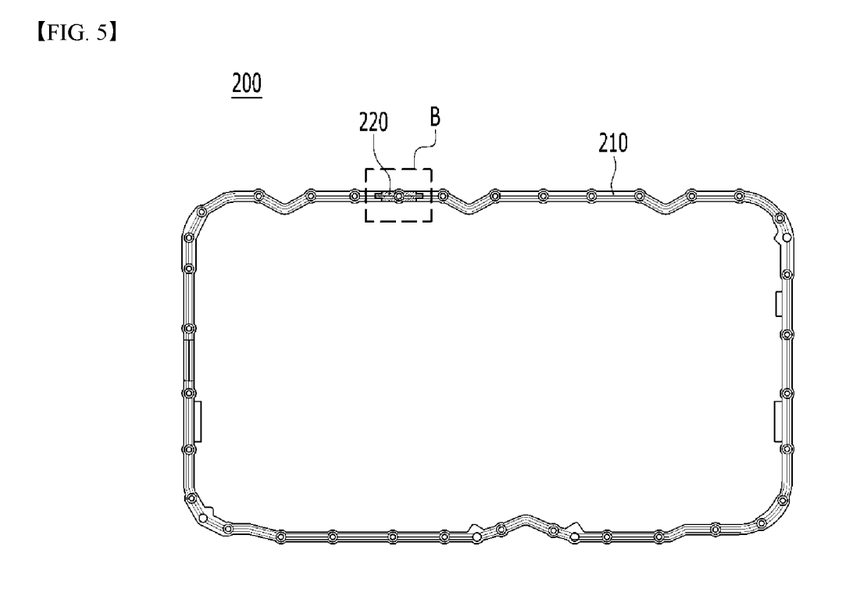
FIG. 5 is a diagram showing a gasket according to one embodiment of the present disclosure.

FIG. 4 is an exploded perspective view showing a battery pack according to one embodiment of the present disclosure. FIG. 5 is a diagram showing a gasket according to one embodiment of the present disclosure.

Referring to FIGS. 4 and 5, in the battery pack according to one embodiment of the present disclosure, a lower case 120 and an upper case 110 are combined with a cell assembly held in a built-in state. Inside the battery pack, cell assemblies having different numbers form an upper and lower stacked structure.

The gasket 200 is formed in an annular shape along the outer peripheries of the cases between the lower case 120 and the upper case 110 to seal between the cases. The gasket 200 may be formed of a rubber material.

The gasket 200 may be connected to the cases through a fastening part 111 formed on the upper case 110 and a fastening portion 121 formed on the lower case 120. The fastening part 111 formed in the upper case 110 may be formed in plural numbers along the circumference where the upper case 110 meets the lower case 120. Similarly, a plurality of fastening parts 121 formed on the lower case 120 may also be formed along the circumference where the lower case 120 meets the upper case 110. The gasket 200 may also be formed with a plurality of fastening parts along the annular circumference. The fastening part of each upper case 110, the fastening part of the lower case 120, and the fastening part of the gasket 200 are all formed at positions corresponding to the vertical direction, and the respective fastening parts may be vertically connected to each other via a fastening member. The fastening member may be formed of a bolt and a nut.

Conventionally, all portions of the gasket were formed of the same material, and the gasket was sealed around the upper and lower cases with the same sealing force. However, if pressure exceeding the sealing force of the gasket is generated due to internal ignition, gas may be discharged through all gasket surfaces in the 360-degree direction. When the battery pack is mounted on the vehicle, there was a risk of hot gases being discharged in the direction of the fuel tank and vehicle parts.

However, according to one embodiment of the present disclosure, as shown in FIG. 5, the gasket 200 includes a first sealing part 210 and a second sealing part 220 connected to each other. When the temperature rises, the second sealing part 220 is melted before the first sealing part 210, and gas inside the cases is discharged to the outside through the melted second sealing part 220.

The first sealing part 210 according to the present disclosure may be formed of EPDM-based rubber, and the second sealing part 220 may be formed of NR-based rubber. The maximum application temperature of EPDM-based rubber is 150 degrees Celsius, and the maximum application temperature of NR-based rubber is 90 degrees Celsius. NR-based rubber has a lower melting point than EPDM-based rubber, so it may melt first when the temperature rises. Therefore, the second sealing part 220 is melted before the first sealing part 210, and gas inside the battery pack may be discharged to the outside through the melted second sealing part.

Therefore, the second sealing part 220 according to the embodiment of the present disclosure can be provided at a location desired by the user, and gas inside the battery pack may be discharged in the direction in which the provided second sealing part 220 is located, whereby the position of the second sealing part 220 can be set in the direction in which vehicle parts and fuel tanks are not located, to thereby prevent in advance a risk that may occur through the discharged gas.

Hereinafter, a second sealing part according to one embodiment of the present disclosure will be described in more detail.

Figure 6:
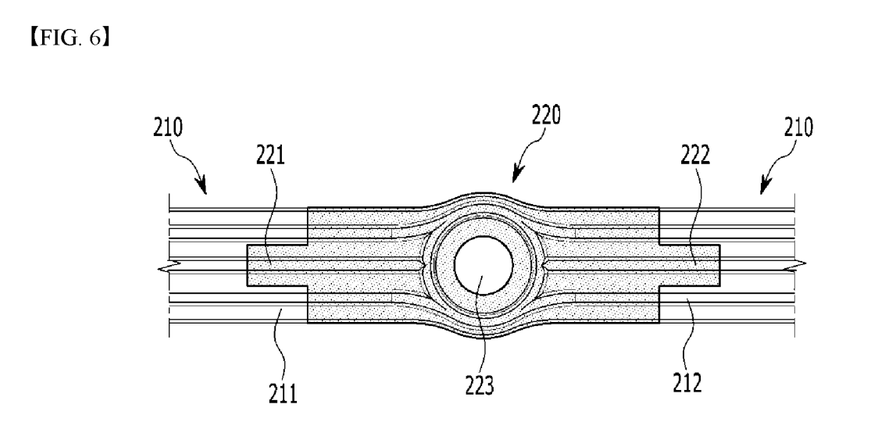
FIG. 6 is a diagram showing a second sealing part formed in the part B of FIG. 5.
Figure 7:
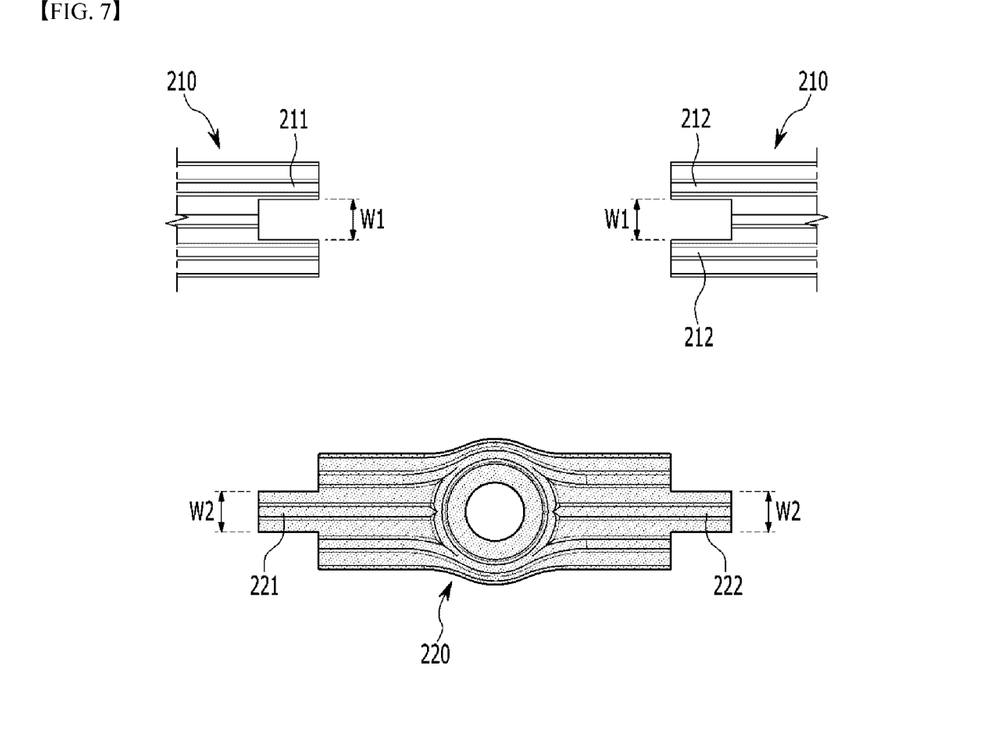
FIG. 7 is a diagram showing a state in which the second sealing part of FIG. 6 is disassembled.
Figure 8:
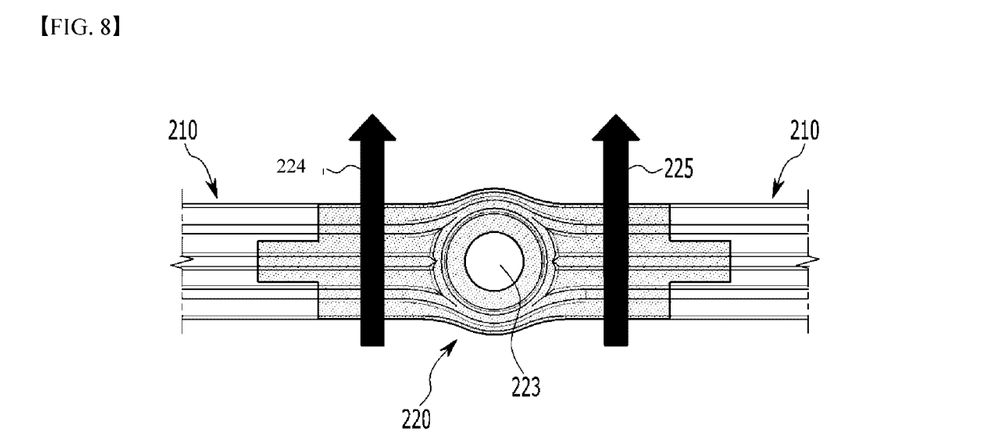
FIG. 8 is a diagram showing a state in which a gas discharge channel according to one embodiment of the present disclosure is formed.

FIG. 6 is a diagram showing a second sealing part formed in the part B of FIG. 5. FIG. 7 is a diagram showing a state in which the second sealing part of FIG. 6 is disassembled. FIG. 8 is a diagram showing a state in which a gas discharge channel according to one embodiment of the present disclosure is formed.

Referring to FIGS. 6 to 8, the second sealing part 220 according to one embodiment of the present disclosure may include protrusion parts 221 and 222 formed at both ends, and a bush 223 formed at the center.

The protrusion parts 221 and 222 may be formed so as to project toward different directions from the center of both ends of the second sealing part 220. The protrusion parts 221 and 222 can be respectively fitted with groove parts 211 and 212 formed at both ends of the first sealing part 210.

According to one embodiment of the present disclosure, as shown in FIG. 7, the width W2 of the protrusion parts 221 and 222 of the second sealing part 220 may be formed wider than the width W1 of the groove parts 211 and 212 of the first sealing part 210. In this way, the width W2 of the protrusion parts 221 and 222 is formed wider than the width W1 of the groove parts 211 and 212, and thus the first sealing part 210 and the second sealing part 220 can be firmly connected to each other through an insertion fitting based on an overlapping structure.

The bush 223 is formed in the center of the second sealing part 220, and is formed to correspond in a vertical direction to any one of the fastening parts 111 of the upper case 110 and any one of the fastening parts 121 of the lower case 120, so that the second sealing part 220 may be connected to the upper case 110 and the lower case 120 via the fastening member 300 to fix the position of the second sealing part 220. More specifically, the second sealing part 220 is disposed at a location desired by the user among the circumferential portions to which the upper and lower cases 110 and 120 are connected, and the second sealing part 220 disposed at a desired position via the bush 223 may be fixed between the upper and lower cases 110 and 120.

The fastening member 300 may be connected via the fastening parts 111 and 121 of the bush 223 and the upper and lower cases 110 and 120 formed at positions corresponding thereto. According to one embodiment of the present disclosure, the fastening member 300 may be formed of a bolt and a nut, but is not limited thereto, and a fastening member may be mounted through various embodiments.

Hereinafter, the gas discharge direction according to an embodiment of the present disclosure will be described.

Figure 9:
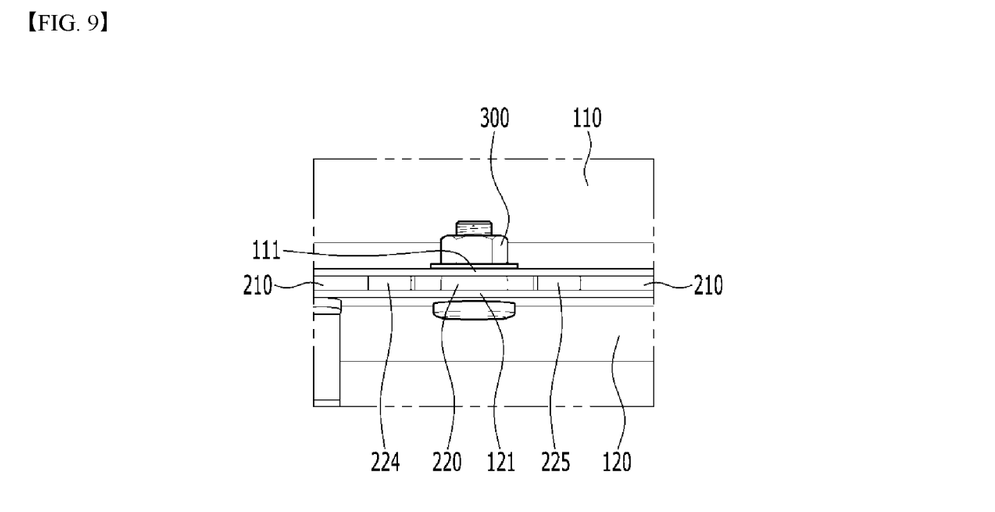
FIG. 9 is a view of the gas discharge channel according to one embodiment of the present disclosure as viewed from a different angle from that of FIG. 8.
Figure 10:
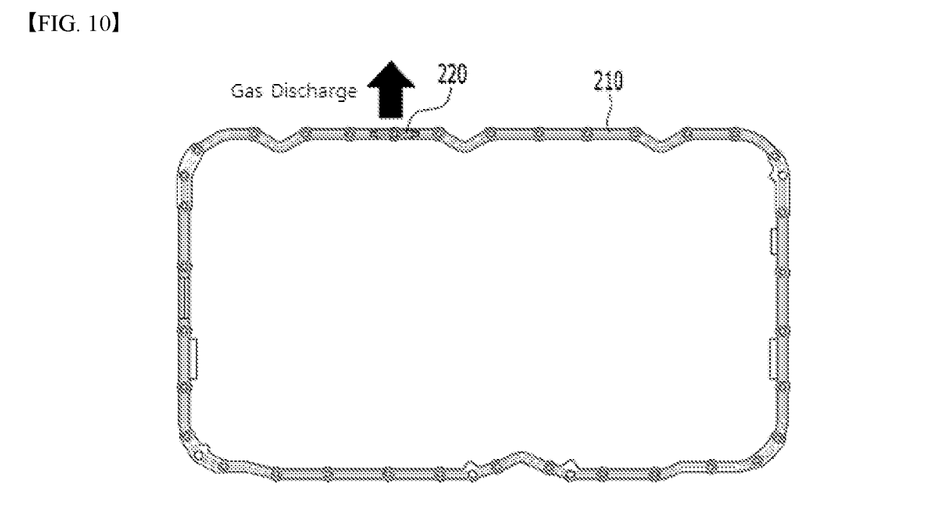
FIG. 10 is a diagram showing a gas discharge position of the gasket according to one embodiment of the present disclosure.
Figure 11:
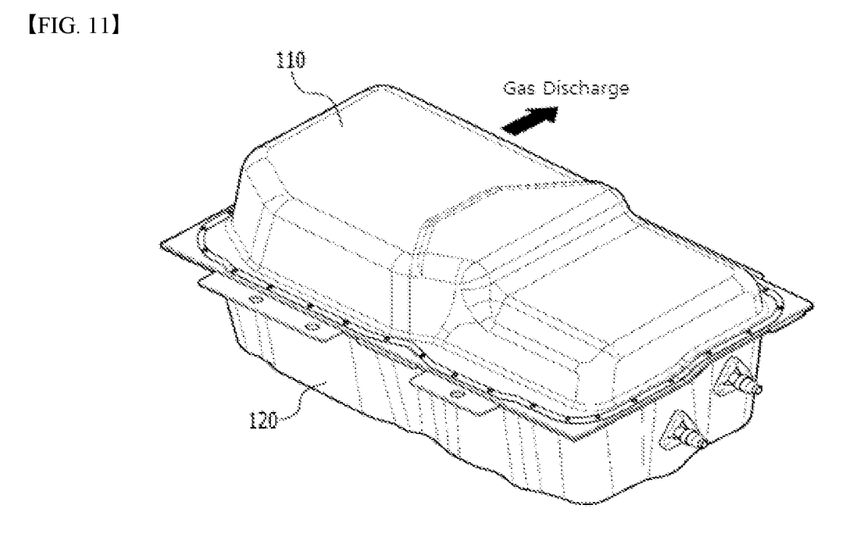
FIG. 11 is a diagram showing a gas discharge position of the battery pack according to one embodiment of the present disclosure.

FIG. 8 is a diagram showing a state in which a gas discharge channel according to one embodiment of the present disclosure is formed. FIG. 9 is a view of the gas discharge channel according to one embodiment of the present disclosure as viewed from a different angle from that of FIG. 8. FIG. 10 is a diagram showing a gas discharge position of the gasket according to one embodiment of the present disclosure. FIG. 11 is a diagram showing a gas discharge position of the battery pack according to one embodiment of the present disclosure.

Referring to FIGS. 8 to 11, the gas discharge channels 224 and 225 according to one embodiment of the present disclosure may be formed on both sides of the bush 223 of the second sealing part 220. As the temperature of the battery pack rises due to the ignition phenomenon inside the battery pack, the second sealing part 220 with a low melting point melts before the first sealing part 210. As the second sealing part 220 is melted, gas discharge channels 224 and 225 may be formed on both sides of the bush 223. Gas inside the battery pack may be discharged to the outside through the gas discharge channels 224 and 225.

Hereinafter, a plurality of second sealing parts formed according to other embodiments of the present disclosure will be described.

Figure 12:
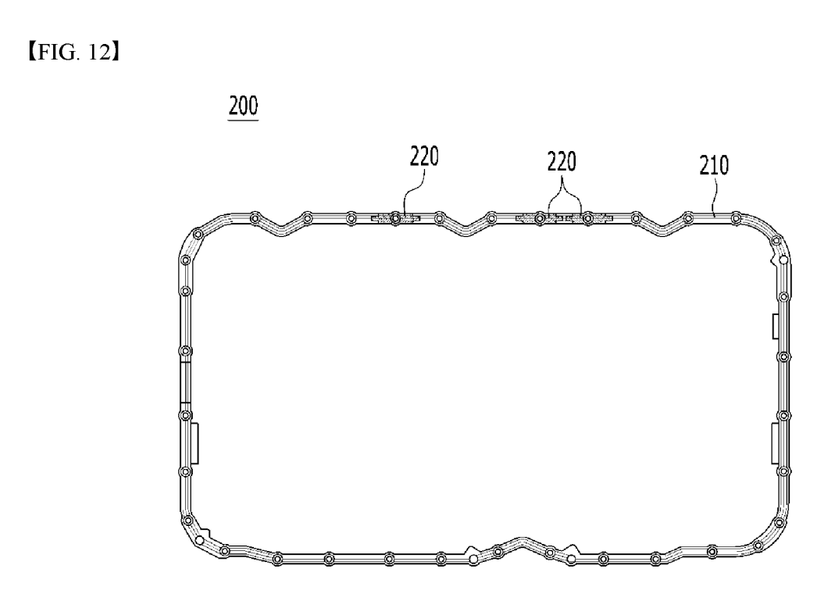
FIG. 12 is a diagram showing a second sealing part according to another embodiment of the present disclosure.
Figure 13:
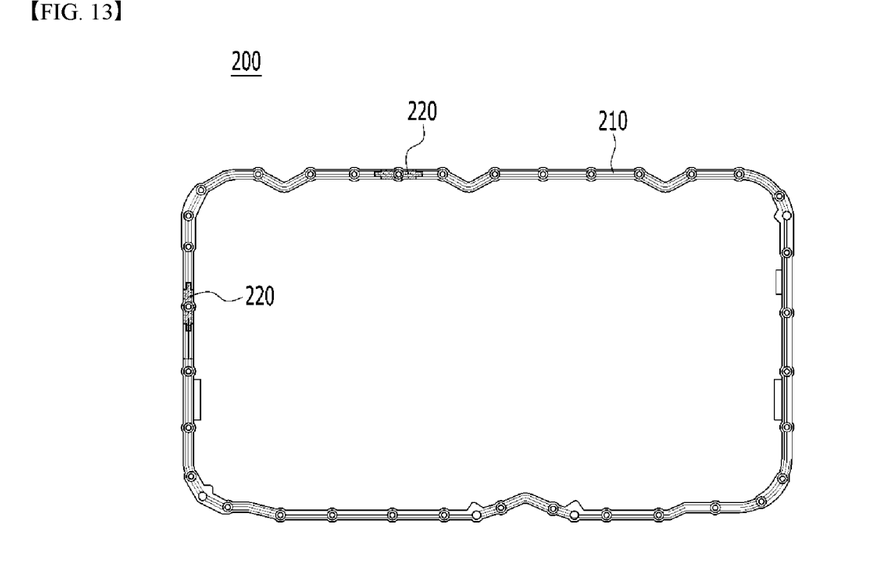
FIG. 13 is a diagram showing a second sealing part according to yet another embodiment of the present disclosure.

FIG. 12 is a diagram showing a second sealing part according to another embodiment of the present disclosure. FIG. 13 is a diagram showing a second sealing part according to yet another embodiment of the present disclosure.

Referring to FIG. 12, the second sealing part 220 according to another embodiment of the present disclosure may be formed in plural numbers, and the plurality of second sealing parts 220 may be disposed at one side of the gasket 200 formed in a square shape. Referring to FIG. 13, the second sealing part 220 according to another embodiment of the present disclosure may be formed in plural numbers, and the plurality of second sealing parts 220 may be disposed at a first side of the gasket 200 formed in a square shape and another side connected to the first side.

Hereinafter, a state in which the battery pack according to one embodiment of the present invention is mounted on the device D will be described.

Figure 14:
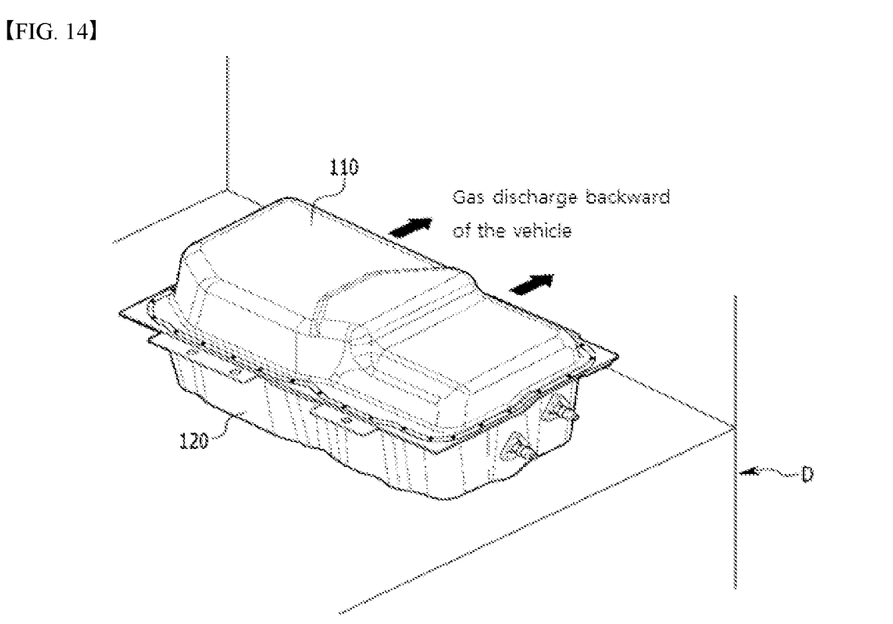
FIG. 14 is a diagram showing a state in which the battery pack according to one embodiment of the present disclosure is mounted on the device D.

FIG. 14 is a diagram showing a state in which the battery pack according to one embodiment of the present disclosure is mounted on the device D.

Referring to FIGS. 10 and 14, the second sealing part 220 of the battery pack according to another embodiment of the present disclosure may be formed in the portion of the gasket 200 that faces the outside. Therefore, the hot gas is not discharged in the direction of the parts formed inside the device, but the gas is discharged to the outside, thereby protecting the parts installed in the device. According to one embodiment of the present disclosure, the device may be formed for a vehicle, and the battery pack is disposed at the backward part of the vehicle. The second sealing part 220 is also disposed toward the backward part of the vehicle so as to face the outside, so that hot gas is discharged to the external space to protect parts installed in the vehicle.

In addition, the device according to another embodiment of the present invention includes the above-mentioned battery pack as a power source. These devices may be applied to transportation means such as an electric bicycle, an electric vehicle, a hybrid vehicle, but the present disclosure is not limited thereto and can be applied to various devices that can use the secondary battery.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS

110: upper case
111: fastening part
120: lower case
121: fastening part
200: gasket
210: first sealing part
211, 212: groove part
220: second sealing part
221, 222: projection part
223: bush 224, 225: gas discharge channel
300: fastening member

The invention claimed is:
1. A battery pack comprising:
a lower case and an upper case; and
an annular gasket formed between the lower case and the upper case to seal the lower case and the upper case,
wherein the gasket includes a first sealing part and a second sealing part connected to each other,
wherein a melting point of the second sealing part is lower than a melting point of the first sealing part,
wherein projection parts are formed at opposite ends of the second sealing part, and groove parts are formed at ends of the first sealing part,
wherein each of the groove parts is vertical and extends an entire height of the first sealing part from a top surface to a bottom surface of the first sealing part,
wherein the projection parts are compressed and fitted into the groove parts, and
wherein prior to fitting the projection parts into the groove parts, a width of each of the projection parts of the second sealing part is wider than a width of each corresponding groove part of the first sealing part.

2. The battery pack according to claim 1, wherein a bush is formed in a center of the second sealing part, and
wherein a fastening member is inserted into the bush to fix a position of the second sealing part.

3. The battery pack according to claim 2, wherein gas discharge channels are formed on opposite sides of the bush through melting of the second sealing part, and gas inside the cases is discharged out of the battery pack through the gas discharge channels.

4. The battery pack according to claim 2, wherein the fastening member is a bolt and a nut.

5. The battery pack according to claim 2, wherein a fastening part is formed in each of the upper case and the lower case, and the fastening member connects the bush and the fastening parts.

6. The battery pack according to claim 1, wherein the first sealing part is formed of ethylene propylene diene monomer (EPDM) based rubber, and the second sealing part is formed of natural rubber (NR) based rubber.

7. The battery pack according to claim 1, wherein the second sealing part is a plurality of second sealing parts.

8. The battery pack according to claim 7, wherein the gasket is formed in a square shape, and the plurality of second sealing parts are arranged at one side of the gasket.

9. The battery pack according to claim 7, wherein the gasket is formed in a square shape, and the plurality of the second sealing parts are arranged at a first side of the gasket and a second side connected to the first side.

10. A device comprising the battery pack according to claim 1, wherein the second sealing part is formed in a portion facing outside of the battery pack.

* * * * *